United States Patent [19]
Sejnoha

[11] Patent Number: 5,008,941
[45] Date of Patent: Apr. 16, 1991

[54] METHOD AND APPARATUS FOR AUTOMATICALLY UPDATING ESTIMATES OF UNDESIRABLE COMPONENTS OF THE SPEECH SIGNAL IN A SPEECH RECOGNITION SYSTEM

[75] Inventor: Vladimir Sejnoha, Cambridge, Mass.

[73] Assignee: Kurzweil Applied Intelligence, Inc., Waltham, Mass.

[21] Appl. No.: 332,571

[22] Filed: Mar. 31, 1989

[51] Int. Cl.⁵ .............................................. G10L 5/00
[52] U.S. Cl. ........................................ 381/43; 381/47
[58] Field of Search ................................... 381/43, 47

[56] References Cited

U.S. PATENT DOCUMENTS

| | | | |
|---|---|---|---|
| 4,142,066 | 2/1979 | Ahamed | 179/1 P |
| 4,185,168 | 1/1980 | Graupe et al. | 179/1 P |
| 4,227,046 | 10/1980 | Nakajima et al. | 381/47 |
| 4,277,645 | 6/1981 | May, Jr. | 179/1 SC |
| 4,630,304 | 12/1986 | Borth et al. | 381/94 |
| 4,636,586 | 1/1987 | Schiff | 379/390 |
| 4,696,041 | 9/1987 | Sakata | 381/46 |

OTHER PUBLICATIONS

"Demisyllable-Based Isolated Word Recognition System", Rosenberg et al., *IEEE Transactions on Acoustics, Speech, and Signal Processing*, vol. ASSP-31, No. 3, Jun., 1983, pp. 713-725.

"Adaptive Labeling: Normalization of Speech by Adaptive Transformation Based on Vector Quantization", Nadas et al., IEEE, 1988, pp. 521-524.

"Unsupervised Speaker Adaptation of Spectra Based on a Minimum Fuzzy Vector Quantization Error Criterion", Matsumoto et al., Second Joint Meeting of ASA and ASJ, Nov., 1988.

"Rapid Speaker Adaptation Using a Probabilistic Spectral Mapping", Schwartz et al., IEEE, 1987, pp. 633-636.

"Speaker Adaptation Through Vector Quantization", Shikano et al., IEEE, 1986, pp. 2643-2646.

*Primary Examiner*—Emanuel S. Kemeny
*Attorney, Agent, or Firm*—Hale and Dorr

[57] ABSTRACT

A speech recognition method and apparatus take into account a system transfer function between the speaker and the recognition apparatus. The method and apparatus update a signal representing the transfer function on a periodic basis during actual speech recognition. The transfer function representing signal is updated about every fifty words as determined by the speech recognition apparatus. The method and apparatus generate an initial transfer function representing signal and generate from the speech input, successive input frames which are employed for modifying the value of the current transfer function signal so as to eliminate error and distortion. The error and distortion occur, for example, as a speaker changes the direction of his profile relative to a microphone, as the speaker's voice changes or as other effects occur that alter the spectra of the input speech frames. The method is automatic and does not require the knowledge of the input words or text.

24 Claims, 4 Drawing Sheets

METHOD AND APPARATUS FOR AUTOMATICALLY UPDATING ESTIMATES OF UNDESIRABLE COMPONENTS OF THE SPEECH SIGNAL IN A SPEECH RECOGNITION SYSTEM

BACKGROUND OF THE INVENTION

The invention relates generally to speech recognition systems and in particular to a method and apparatus for automatically updating an error compensation signal relating to the characteristics of the speaker and the transfer function between the speaker and the speech recognition system.

It is well known that speech recognition systems contend with many variable factors, such as background noise, the location of the microphone relative to the speaker, the direction in which the speaker is speaking, the context of the speech including the level of emotion in the speaker's voice, the rate of speech, changes due to speaker fatigue, etc. Each of these factors can vary over time and has an adverse effect on the ability of a recognition system to determine or recognize the words or utterances of a (known or unknown) speaker; and accordingly, many different speech recognition approaches have been proposed to correct for or take into account the potential variations which tend to mask the lexical content of the speech signal. Indeed, this is one of the reasons why speech recognition is a difficult and challenging problem. These factors are different than the normal variability in the pronunciation of words for which speech recognition systems apply different recognition techniques.

In one particular speech recognition system, described in Feldman et al, U.S. Pat. No. 4,799,262, filed June 22, 1985, and granted Jan. 24, 1989 (the specification of which is incorporated, by reference, in this application), a speech recognition system is described which uses a code book containing a plurality of quantized vectors which reflect the range of sounds a user can produce, and to which unknown incoming speech frames are compared. Sequences of the vectors thus represent the words in the recognition vocabulary. Each input word is assigned a sequence of vectors and the system recognizes words by examining these sequences. Both the generation of the codebook during an enrollment phase and the assignment of the codebook vectors to input speech during training and recognition are influenced by the so-called speaker or system "transfer function." This function can be viewed as, in effect, distorting the ideal, intended output of the speaker by the time the audio output is converted into electrical signals at the receiving microphone. Incorporated in this transfer function are both characteristics associated with the speaker's voice type, the characteristics of the microphone, the direction and distance of the speaker from the microphone, as well as environmental effects. This transfer function changes over time, due to, for example, changes in the position of the microphone or changes in the user's voice. When such changes occur, the input signal no longer closely matches the codebook, incorrect vectors are selected, and recognition performance suffers. Consequently, it is important to track changes in the transfer function and compensate for them.

One typical way to do so, described in U.S. Pat. No. 4,799,262, is to require the user to periodically perform a "mike check." The mike check consists of the user speaking a small set of known words which are used by the system to compute an estimate of the transfer function and compensate for it. The set of words spoken during a mike check is fixed so as not to compound the problem of tracking changes in the transfer function by introducing changes due to the different spectral content of different words. Alternately, some systems do not require a mike check but average successive input words to deemphasize the spectral contribution of individual lexical items; but to do so properly (especially in specialized applications) requires a very long adaptation time which makes it difficult to adequately track the changing transfer function.

While doing mike checks during enrollment may constitute an adequate solution to the problem of tracking the varying transfer function, users are less willing to interrupt useful work to perform mike checks during recognition and, accordingly, changes in the transfer function can dramatically and adversely affect the resulting accuracy of the speech recognition process as substantial errors of recognition can occur. It is thus highly desirable to track the changing transfer function automatically, without additional work by the user and therefore any such automatic method must be able to operate with unknown input speech and be inherently stable since it must work in an unsupervised fashion.

Systems have employed, for example, methods which determine non-speech boundaries of the incoming speech signal, and then set noise thresholds which depend upon the level of the actual noise measured during non-speech. Still other systems are directed toward providing better representations of the noise during non-speech times so that a better recognition of speech can be obtained by subtracting the "true" noise from the speech signal during actual speech. These systems, however, typically do not take into account the effective "noise" which results from movement of the microphone or the relation between the speaker and the microphone, and changes in the speaker's voice which can vary in a random fashion.

In addition, systems for reducing stationary noise or for filtering near stationary noise have been provided using, for example, Weiner or Kalman filter theory for minimization where a prior knowledge of the noise is acquired and is not assumed. These systems, also, do not take into account the transfer function from speaker to microphone, and do not allow for the automatic adaptation of the actual speech using statistics available during and from the speech process itself.

Other systems try to account for the transfer function but either (a) require knowledge of input text that is, a kind of retraining, (b) assume that the speech recognition outputs are correct and use word identities (an assumption which cannot be properly made) or (c) require various and impractical adaptation time, to average out word information.

Accordingly, an object of the invention is a method and apparatus for continuously updating a data correction signal representing the speaker to microphone system transfer function and which can be employed during actual speech recognition or training of the system. Other objects of the invention are a speech recognition method and apparatus which provide higher accuracy of speech recognition, which adapt to changing speaker/microphone conditions in an automatic manner, which provide accurate high level updating of the speaker transfer function without interrupting the speech recognition process, and which provide for efficient and more precise speech recognition using a vector quantization code book analysis.

SUMMARY OF THE INVENTION

The invention relates to a speech recognition apparatus and method for recognizing input speech data. The apparatus of the invention provides for updating the parameters of a transformation function, the purpose of which is to deemphasize those components of the speech signal which do not carry lexical information and which thus cause poor recognition performance in the apparatus. These components can result from a particular speaker's voice, a particular lip-to microphone transfer function, microphone type, etc. The values of these parameters typically change over time and thus need to be tracked. The particular illustrated embodiment of the invention models these components as an additive error spectrum (designated an "LTA") (in the log-spectral domain) and estimates the error vector automatically. Other models of the transformation functions (that is, ones which are not merely additive in the log-domain) can equally well be used in the method and apparatus described here. The updating of the model parameters operates with unknown input speech; and consequently, the method must be able to distinguish between aspects of the input signal which contain lexical information and those characteristics which represent the changes in the transfer function. The present invention accomplishes this goal by an iterative process which involves the association of each input speech frame with the closest stored standard frame. The difference between the two frames is assumed to be explained by changes in the transfer function and is used in the derivation of the parameters of the model of the transformation function. After an adequate number of input frames are observed, the model parameters are updated and the model is used to modify new input frames. These are in turn compared to the standard representative frames and the cycle continues. Since frames spanning the entire speech space are considered, only global, systematic transfer function changes are tracked and the process cannot diverge. The process is complete when systematic discrepancies between input frames and the closest standard representative frames have been eliminated.

The apparatus features circuitry for updating an error compensation signal representing a system transfer function between the speaker and the recognition apparatus. The updating apparatus features circuitry for generating an initial compensation signal; circuitry for generating, from the input speech data, a succession of speech representing input frames, modified by the compensation signal, and which include as a distorting value, a current error signal corresponding to the difference between the compensation signal and the actual compensation signal values determined by the then system transfer function; circuitry for associating each speech representing input frame with one of a plurality of speech representing standard frames; circuitry for accumulating the differences between respective successive speech representing input frames and the associated speech representing standard frames; circuitry for periodically determining an average update signal representative of a selected number of the accumulated differences; and circuitry for updating the compensation signal in accordance with the average difference signal to generate a new current compensation signal.

The apparatus further features an associating circuitry having elements for associating each input frame with a spatial volume in a speech recognition decision space, each volume being characterized by its centroid, and wherein the accumulating circuitry sums the difference in value between the input frames and the centroid of the volume associated with that frame.

Preferably, the updating step is automatically performed no more often than about every fifty input words, as determined by the speech recognition apparatus, and the generating circuitry selectively discriminates from generating frames during those time durations including either silence or noise as the sole input. When the compensation signal is the long term average data signal, the circuitry further features elements for removing any DC offset from the averaged long term average data signal.

The method of the invention features the steps of initially generating the error compensation signal; generating from the speech input a succession of input frames representing the speech input modified by a current compensation signal, each input frame including, as a distorting value, a signal corresponding to an uncompensated error instantaneous value of a system transfer function; associating each speech representing input frame with one of a plurality of speech representing standard frames; successively accumulating the differences between successive speech representing input frames and the respective associated speech representing standard frames; periodically determining an average update signal representative of a selected number of said accumulated differences; and updating the compensation signal in accordance with said periodically determined average update signal.

In specific embodiments of the invention, the method features associating each input frame with a spatial volume in a speech recognition decision space, each volume being characterized by a centroid representing the standard frame, and summing the difference in value between the input frames and the associated centroid of the associated volume. Preferably, the number of centroids is less than the number of standard frames used in the speech recognition application. The updating step preferably operates no more than about once every fifty input words, as determined by the speech recognition method being employed.

DESCRIPTION OF THE DRAWINGS

Other objects, features, and advantages of the invention will be apparent from the following description of a preferred embodiment taken together with the drawings in which.

DESCRIPTION OF A PREFERRED EMBODIMENT

Figure 1:
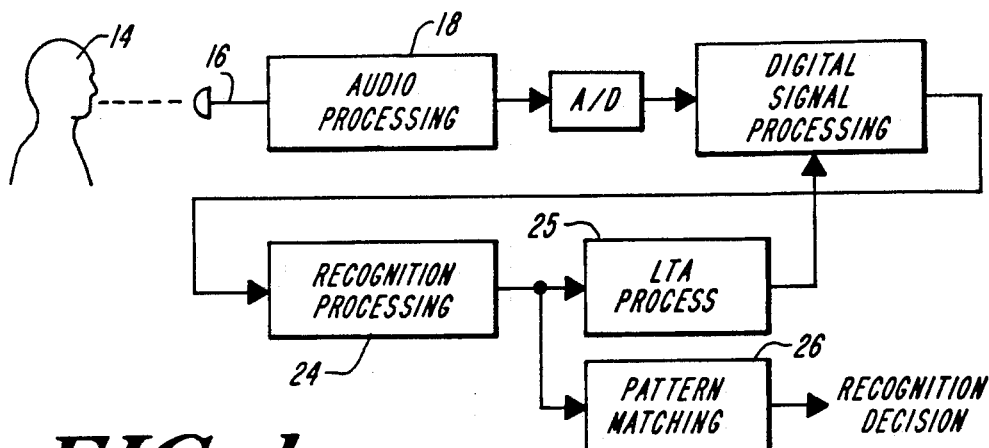
FIG. 1 is a schematic block diagram of an overall speech recognition system in accordance with the invention.

Referring to FIG. 1, a typical speech recognition apparatus has a microphone or other audio input device 12 for receiving the audio speech input from a speaker 14. The output of the audio input device 12, an analog audio signal over a line 16, is delivered to an audio processing circuitry 18 which typically includes at least an audio amplifier and audio filtering. The output of the audio processing circuitry 18 is directed to an analog to digital converter circuitry 20. The analog to digital circuitry 20 digitizes the audio input from the audio processing circuitry for processing by the remainder of the speech recognition apparatus which operates in the digital domain. The sampling rate of the analog to digital converter is typically in excess of 16,000 samples per second.

The digital output of the analog to digital (A/D) converter 20 is received by a digital signal processing circuitry 22. The digital signal processing circuitry can operate, in accordance with the general speech processing field, according to many different speech recognition methods. In the illustrated and preferred embodiment of the invention, the digital signal processing circuitry 22 and a recognition processing circuitry 24, typically implemented in software, operate in accordance with the method and apparatus described in U.S. Pat. No. 4,799,262, granted Jan. 24, 1989, and identified above. The output of the digital processing circuitry is typically, in the illustrated embodiment of the invention, a sequence of speech recognition vectors which represent the incoming audio speech from the speaker 14. These vectors are compared, in the recognition processing circuitry, with a code book of preselected quantized vectors from which speech recognition decisions are made. The sequences of vectors representing an input word are used by pattern matching software 26 in arriving at a recognition decision. The speech recognition decision can be applied to a speech application method or apparatus, can be displayed on a display screen, or can be applied, for example, to a digital computer for further processing.

Figure 2:
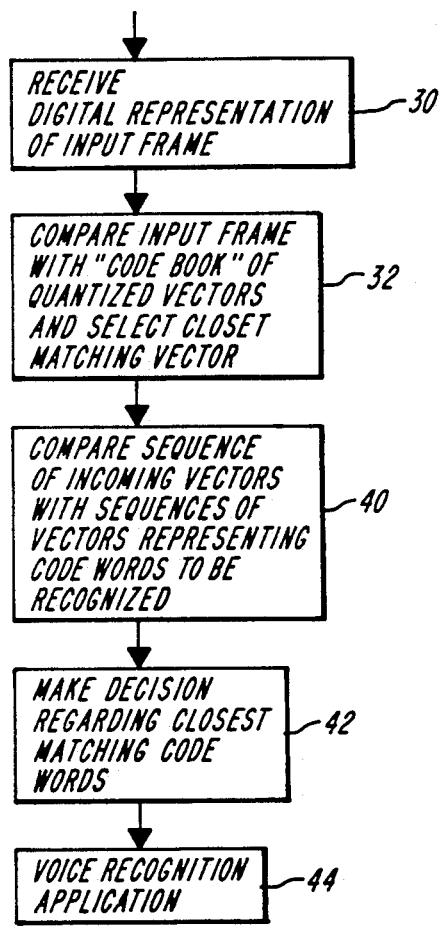
FIG. 2 is a schematic flow chart illustrating operation of the apparatus of FIG. 1 in accordance with the invention.

Referring now to the flow chart of FIG. 2, in accordance with the preferred speech recognition apparatus of the invention, that apparatus being described in general terms in the above-identified United States patent, the digital signal processing circuitry 22 receives, at 30, the digital samples from the A/D converter 20 and generates representations of the speech in the form of successive input frames. The digital representation described by each of the input frames will typically be the logarithms of spectral values of the input signal, at a given time, for each of a plurality of spectral bandwidths in the range of 0-7,000 hertz. These input frames, according to this embodiment, form input frame vectors, and are then compared, at 32, with each of the standard preselected quantized vectors in a code book. The preselected vectors (or "standard frames") are stored in memory in the apparatus and are the vectors generated during the enrollment process.

There exists, in association with the code book vectors and the input frame vectors, a multidimensional recognition space, and associated with each quantized preselected vector is a decision vector space. If the input frame vector is within the associated decision space, the quantized preselected vector is chosen as the vector to be associated with that input frame vector. Typically, the notion of closest matching vector is used to define the vector decision space and is that preselected vector for which the distance between the input frame vector and a preselected vector is a minimum for the "matching preselected vector."

Figure 3:
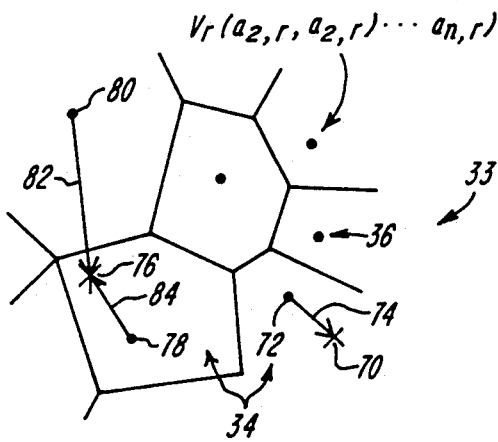
FIG. 3 is a schematic illustration of the speech recognition space into which the input speech "vectors" are placed.

Referring, for example, to FIG. 3, a vector space 33 can be divided into a plurality of volumes 34 and with each volume is associated a quantized preselected vector 36. Typically, the spaces are irregular as illustrated in FIG. 3, and have generally linear boundaries. The vectors exist in a n-dimensional space so that the quantized vector $V_r$ has as its arguments $a_{1,r}, a_{2,r} \ldots, a_{n,r}$. Thus, if an input frame is located within a volume $34_i$, it is then associated with the quantized vector $V_i$, having argument values $a_{1,i}, a_{2,i}, \ldots, a_{n,i}$.

Referring again to FIG. 2, after a sequence of input frames has been "quantized" and is represented by a sequence of quantized vectors from the "code book," the sequence is compared, at 40, with the stored vocabulary "words or items" represented by sequences of the quantized vectors (a sequence of quantized vectors can then represent a code word to be "recognized"). Typically, the stored code word and an input sequence of quantized vectors do not match exactly and a decision for determining the closest matching code word(s) is undertaken at 42, as described in detail in the above-referenced patent. Once the closest matching code word or code words have been determined, they are passed to a speech recognition application at 44. One application may simply be to present the closest matching code word and alternate choices, that is, the second, third, etc., closest matching code words, for display on a monitor. Other applications may include printing the code words in a document, causing various actions to occur in an industrial process, etc.

During the process of forming the quantized input frame vectors, various external influences can substantially and severely adversely affect the resulting accuracy and precision of the system. For example, changes in the speaker's voice, the occurrence of external noise into the system may alter the spectral frequencies and amplitude values of the input frame, the movement of the speaker relative to the microphone can further vary the input frame signals, the parameters of the audio processing circuitry, including differences in microphones, can further alter the spectrum of the input frame signals generated by the apparatus. All of these influences, termed herein a system transfer function, are preferably monitored and eliminated by the subtraction of the LTA. This estimate is adapted to track changing conditions, in accordance with the preferred embodiment of the invention, using a long term average data signal (LTA) generated by an LTA update circuit 25 (FIG. 1) (although, as mentioned above, other compensation models or transformations (other than an LTA) can equally well be used).

Figure 5:
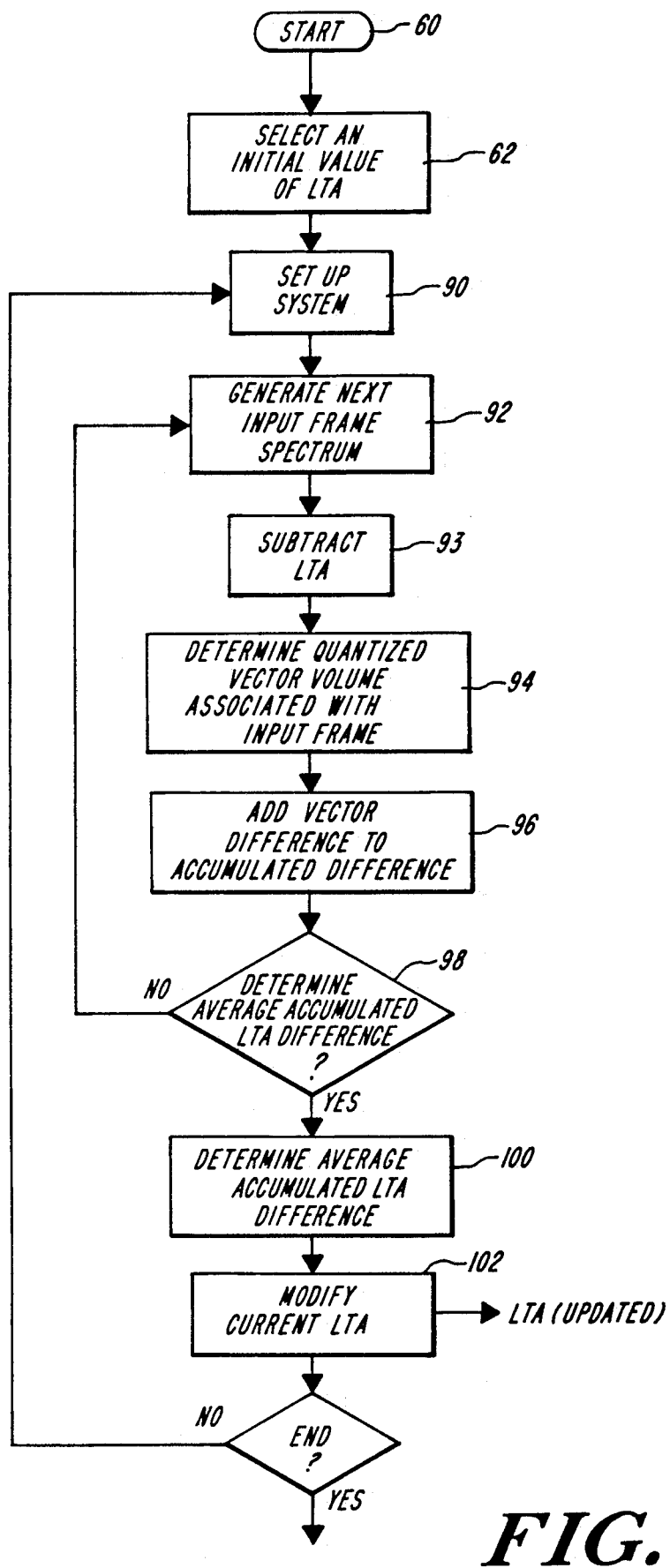
FIG. 5 is a detailed schematic flow chart illustrating operation of the updating apparatus in accordance with a preferred embodiment of the invention.

Referring to FIG. 5, which describes the LTA update process of the LTA circuitry 25 of FIG. 1, in accordance with the invention, once the system is initialized at 60, the apparatus selects, at 62, an initial value for a "long term average data signal" (hereinafter designated the "LTA") which will be subtracted from the input frame (from A/D 20) and generated at 30 (FIG. 2) and prior to comparison of that input frame with the quantized vectors in the code book (in recognition processing circuitry 24) at 32.

In accordance with the invention, after a spectrum for an initial LTA is obtained, the method and apparatus maintain and update the LTA spectrum, reflecting changes, if any, in the user's voice, the acoustic path between the user's lips and the microphone, the frequency response of the microphone and the audio front end, and any other external variable noises or effects which may occur. The updated LTA spectrum is then subtracted from every generated input frame with the intent of eliminating these sources of signal variability since they do not carry information about the lexical content of the words being spoken and could thus cause a false recognition.

In accordance with the invention, the initial LTA is obtained by requiring a speaker to repeat a set of known words, the frames of which are averaged into a single spectrum. This initial LTA is not a true long-term average. To obtain a true LTA would require far more speech data, enough so that it would not matter which words were chosen because word specific spectral information would be averaged out. Since the LTA is preferably required before the first speech frame is processed, requiring the data for a "true" LTA is impractical and, accordingly, an initial LTA having a spectral shape which also reflects the chosen words is generated. While the words which determine the initial LTA can be hand chosen, one cannot assume anything about the lexical content of words spoken during a recognition session except that, most probably, the words will vary and will probably not be a typical representative sample of English (that is, not a "stationary" sample). This is especially true for specialized applications of a speech recognition system such as, for example, recognizing a vocabulary associated with medical radiology. Thus, it is not sufficient to average all of the received frames to obtain an LTA update since successive updates will exhibit differences due to the different sets of words used in deriving the updates as well as differences due to the important changes which were to be the focus of the updates.

These problems are solved in the preferred embodiment of the invention, where the LTA update signals are obtained by using the vector quantization matching process described above. That is, an input frame vector, $\bar{I}(i_1, i_2, \ldots, i_n)$, altered (or normalized) by the current LTA estimate, is first associated with the closest matching quantized preselected vector. Once the best matching quantized vector or "VQ centroid," $\bar{V}(v_1, v_2, \ldots, v_n)$, is found for an input frame vector, the difference vector $\bar{D}(v_1-i_1, v_2-i_2, v_3-i_3, \ldots v_n-i_n)$ (difference for each vector argument) between the input frame vector and that best matching VQ centroid is determined. Under ideal conditions, those differences are independent of the identity of the particular frame-centroid pair and reflect the overall mismatch between the set of centroids and the input spectral vectors. Using the frame-centroid differences thus achieves a normalization of the occurrence frequency of input words, since the specific spectral content of the input words is removed by the differencing process. Averaging the differences (Equation 1) thus shows the discrepancy between the current LTA and its desirable or optimum shape.

$$\text{Avg. Diff.} = (1/x) \sum_{j=1}^{x} V_j - I_j \quad \text{(Equation 1)}$$

Furthermore, updating the current LTA by adding to it the average difference vector (defined in Equation 2) does not obliterate any component, due to the original word set in the LTA, that is, the original LTA value which is embedded in the reference code book vectors and thus must also be subtracted from the new frames.

Smoothed average difference LTA
Update=½[Previous smoothed average
difference+current average different ] (Equation 2)

The D.C. offset of difference from Equation 2 is removed prior to the summation step in Equation 3 to obtain the new LTA value.

New LTA=Current LTA+Smoothed Average
Difference LTA Update (Equation 3)

In practice, then, and referring to FIG. 3, if a new input frame 70 is associated with a vector quantization centroid 72, then the contribution to the LTA update is the difference represented by the vector 74. The values for these vectors 74 are accumulated; and after, for example, fifty input words, the average update value is determined and used as an actual update to the current LTA signal data value. Only input frames known by the apparatus to correspond to actual speech (as opposed to noise or silence) are employed as valid frames at 92.

In the case of large mismatches between the correct centroid and an input frame, due to large changes in the transfer function, there can result a substantial mislabeling of an input frame as the frames migrate across the code book space boundaries. Thus, for example, if an input frame 76, which should be associated with a first centroid 80 because they both represent the same type of speech event, crosses a boundary such that it will be associated with a centroid 78 instead, an error in the update will occur. Accordingly, instead of selecting the correct vector 82 as the difference value, a very different vector 84 (illustrated as both shorter in magnitude and having a substantially different direction) will be selected. Thus the frame-centroid difference will be based on an incorrect centroid and will suggest an erroneous LTA update adjustment.

Figure 4:
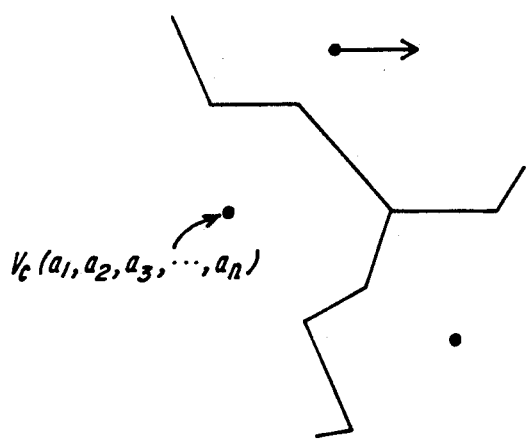
FIG. 4 is a schematic illustration of a speech recognition space according to a preferred embodiment of the invention.

The more and the closer in distance are the boundary crossings (corresponding to smaller volumes and more boundary crossings), the slower will be the convergence of the method. Accordingly, a smaller set of larger decision spaces, and hence a smaller number of centroids can be advantageously employed. Each centroid in the smaller set will have a larger "neighborhood" and hence will be less prone to those boundary crossings which cause errors in the computation of the frame-centroid differences. Referring to FIG. 4, this set of "upper level" centroids (they are called "upper level" because each of these volumes (neighborhoods) contains several of the volumes (neighborhoods) in FIG. 3) thus reduces the likelihood of boundary crossings and, with regard to a serial code book tree, can be viewed as the upper branches of the tree. The optimum number of centroids thus is a trade-off between ensuring adequate normalization and limiting the boundary crossings.

It is not necessary to encode the input frame vectors with a separate small code book in order to employ the upper level centroids. Instead, the number of centroids normally employed in the recognition method (for example 256 as described in U.S. Pat. No. 4,799,262), can be used to create a smaller code book wherein each of the 256 centroids is assigned to one of the centroids in a smaller set. Thus, as each input frame vector is associated with a quantized preselected code book vector in a normal manner, its association with an upper level centroid is obtained at no additional cost. The corresponding upper level spectra are determined ahead of time (at initialization) and the difference between that upper level centroid spectrum and the input frame spectrum is accumulated over, as noted above, fifty or so input words. It is also important to note that the use of a lesser number of centroids does not adversely bias the process because in the absence of a transfer function change (error) the input frames associated with one neighborhood are more or less uniformly distributed over the recognition space in that neighborhood and hence do not bias the LTA update in one or more directions, even though each decision space will encompass a larger number of input frames.

Referring again to FIG. 5, after the initial value $L(l_1, \ldots,)$ of the LTA is determined at 62, the remainder of the recognition system is initialized at 90 and the system then generates, at 92, the spectrum for the next input frame. The current LTA is subtracted from the input frame at 93, and is then associated with a standard frame for the larger set of quantized vector volumes, at 94, and the difference between the input frame and the associated centroid of the smaller set of vector volumes is determined at 96. The differences are accumulated; and once a sufficient quantity of data has been accumulated, as determined at 98, the average accumulated LTA difference is determined and normalized at 100 (where the D.C. offset is removed), averaged (Equation 2), and is added, in accordance with Equation 3, to the current LTA at 102. If more input speech is to be received, the LTA process is reinitialized at 90 and the process continues. If, at 98, an insufficient number of LTA differences have been accumulated, the system returns to the next input frame and determines the next associated difference.

Figure 6:
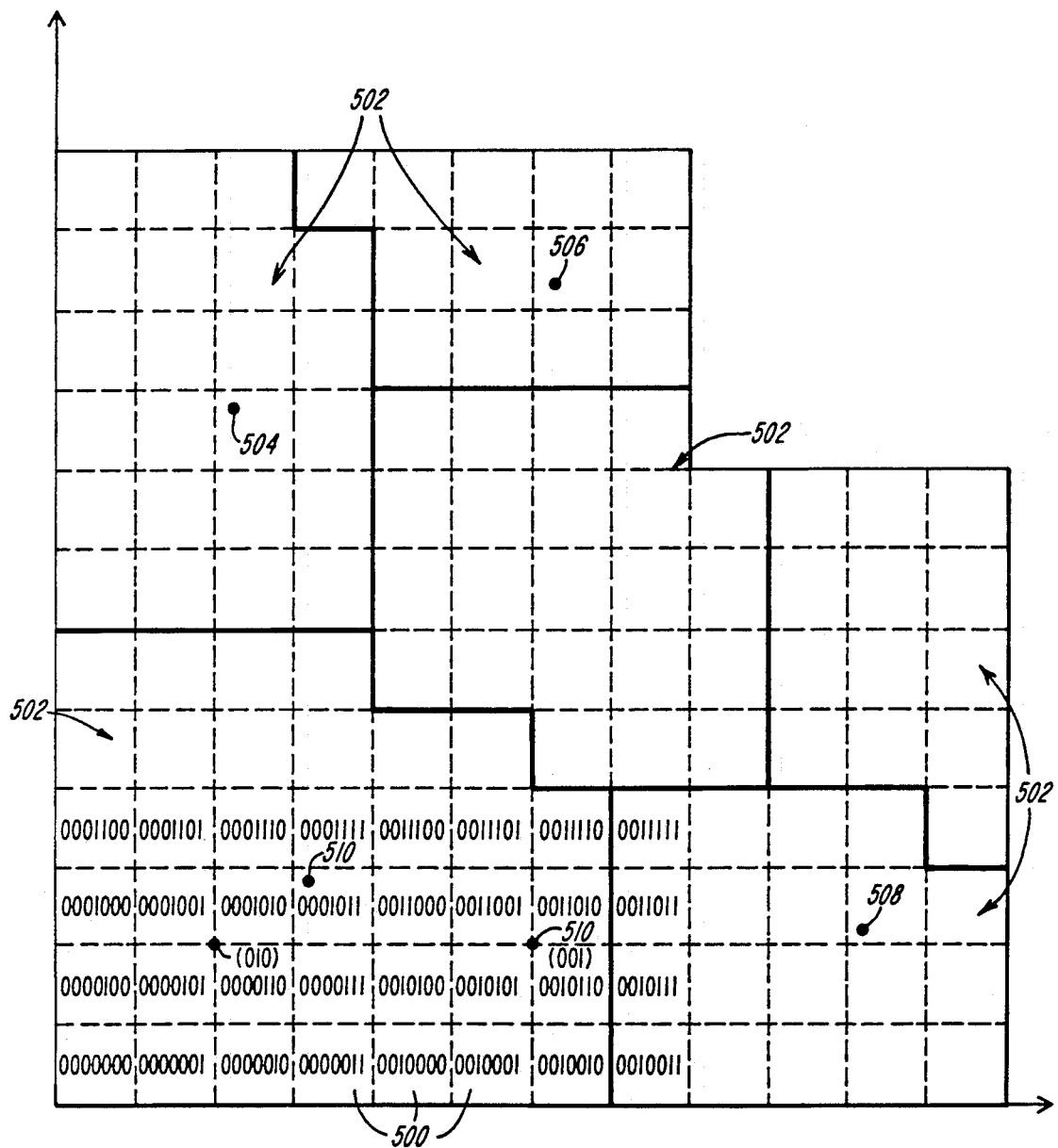
FIG. 6 is a schematic illustration of the upper level/lower level identification of decision/LTA vector spaces in accordance with the invention.

Referring to FIG. 6, a representative two-dimensional decision space has 128 decision volumes 500, each volume being identified by a seven binary digit number, and each volume having associated with it a standard input frame vector which can be, for example, of the class specified in the code book recognition process described in above-identified U.S. Pat. No. 4,799,262. Accordingly, each input frame vector, after subtraction of the then current LTA, is processed and associated with one of the standard vectors in the two-dimensional decision space.

After the standard input vector is identified, the same processed input vector frame can be associated with a centroid representative of a smaller set of larger volumes for use in calculating the update difference value for the current LTA. Each volume of the smaller set (in one preferred embodiment there are six) includes a plurality of the recognition volume decision space elements, and are identified schematically in FIG. 6 as a grouping of six upper level volumes bounded by solid lines. These volumes are numbered 502 and have a centroid associated with the volume, for example at 504, 506, etc. The identification of each centroid can be easily attained simply by associating the standard input frame vector, using an index table, with an upper level centroid. In this manner, substantially no additional computation is necessary to determine the centroid vector corresponding to a standard vector.

Figure 7:
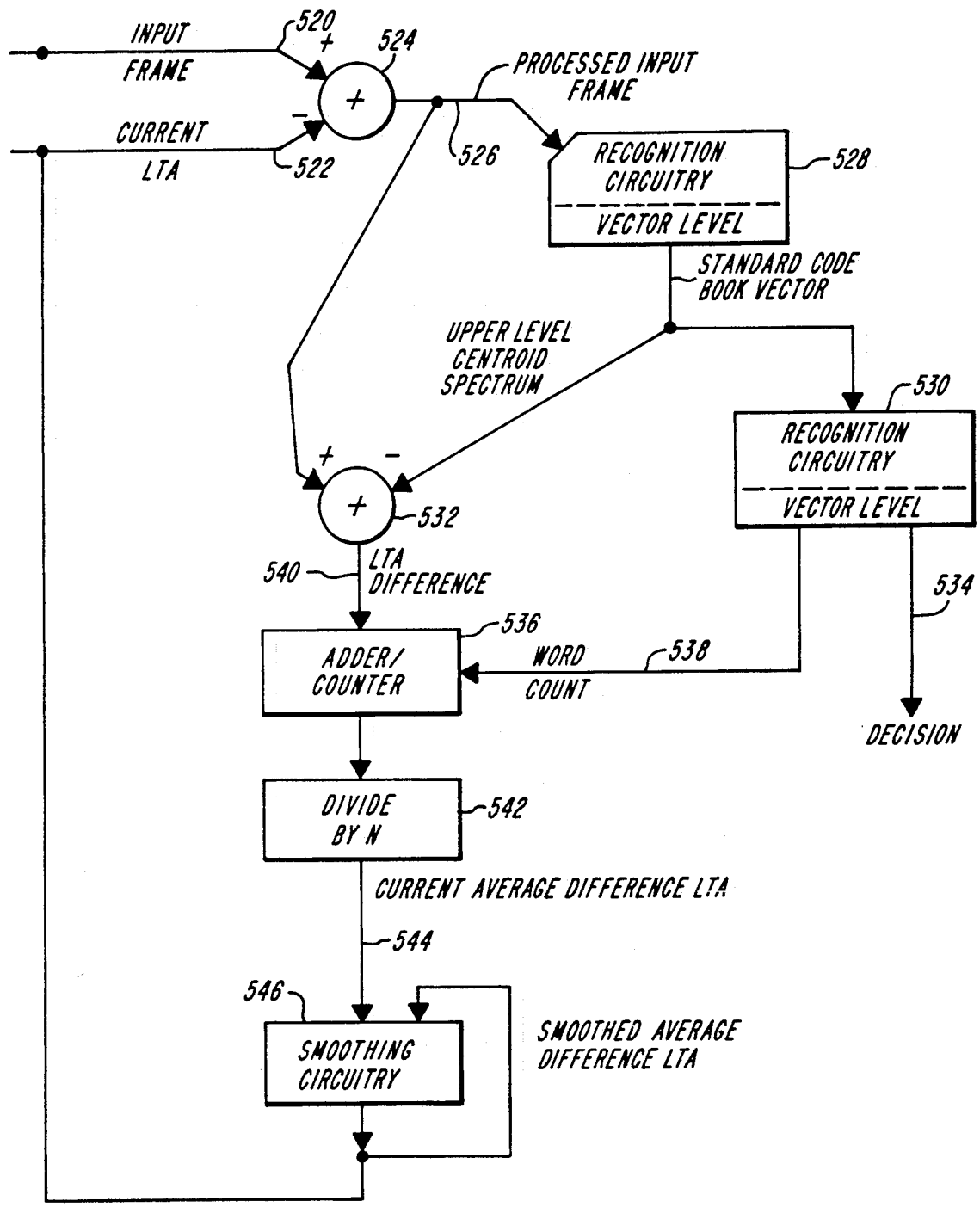
FIG. 7 is a circuit diagram illustrating an apparatus for updating the LTA according to the invention.

Referring now to FIG. 7, in a particular embodiment of the invention for determining and continuously updating the LTA, an input frame from within a speech element (noise is ignored) is available over lines 520 and the current LTA is available over lines 522. These values are differenced in a summation circuitry 524, argument by argument, and the resulting processed input frame is available over lines 526. The processed input frame is directed to a recognition circuitry 528 operating to identify the standard code book vector associated with the processed input frame. The output of circuitry 528, the standard code book vector, is delivered to a word element recognition circuitry 530 and to an LTA difference circuitry 532. The recognition circuitry forms a decision and makes that decision available to application circuitry over lines 534. In addition, the recognition circuitry 530 provides a word count to an adder/counter circuitry 536 over a line 538.

The summation circuitry 532 outputs the difference between the input frame which has been compensated with the current LTA and the upper level centroid corresponding to the associated standard code book vector. (In some special instances, the upper level centroid may also be the standard code book vector.) The successive outputs of circuitry 532, the LTA difference value over lines 540, are summed in the adder/counter circuitry 536. The summation continues until approximately fifty words have been recognized, at which time the output of the adder is made available to a divide by "N" circuitry 542 (where N equals the number of frames in the fifty words for the illustrated embodiment). The adder/counter then resets to sum the input frames corresponding to the next set of words. The output of the divide by "N" circuitry 542 is the current average difference LTA. This is available over lines 544 and is directed to a smoothing circuitry 546. The smoothing circuitry provides at its output the new smoothed average difference LTA value and that value is also fed back to the input of the smoothing circuitry. The smoothing circuitry 546 performs the function specified in Equation 3 above. In this manner, the current LTA signal is updated approximately every fifty words.

In the illustrated embodiment, the smoothing circuitry 546 can also remove the DC offset from the resulting current LTA signal.

Additions, subtractions, deletions, and other modifications of the preferred embodiment will be apparent to those practiced in the art and are within the scope of the following claims.

What is claimed is:

1. In a speech recognition apparatus for recognizing elements of a speech input, apparatus for updating an error compensation signal representing a system transfer function between a speaker and the recognition apparatus, said updating apparatus comprising:
   A. signal generating means for initially generating said compensation signal,
   B. means for generating, from said speech input, a succession of input frames representing said speech input modified by a said compensation signal, each input frame including, as a distorting value, an error signal corresponding to the difference between a current compensation signal and the instantaneous value of a system transfer function, C. means for associating each speech representing input frame with one of a plurality of speech representing standard frames, D. means for accumulating the differences between successive speech representing input frames and the respective associated speech representing standard frames, E. means for periodically determining an average update signal over a plurality of input words representative of a selected number of said accumulated differences, and F. means for updating said compensation signal in accordance with said average update signal.

2. The apparatus of claim 1 wherein said accumulating means comprises
means for summing the differences between successive speech representing input frames and the respective associated speech representing standard frames.

3. The apparatus of claim 2 wherein said determining means comprises
means for finding an average difference value for said summed differences for generating said average update signal.

4. The apparatus of claim 3 wherein said updating means comprises
means for averaging said average update signal and the current correction signal for generating a new and updated current compensation signal.

5. In a speech recognition method for recognizing elements of a speech input, a method for updating a non-speech error compensation signal representing a system transfer function between a speaker and an apparatus input circuitry, said updating method comprising the steps of:

A. initially generating the compensation signal,

B. generating from said speech input, a succession of input frames representing said speech input modified by a current compensation signal, each input frame including as a distorting value, an error signal corresponding to the difference between the current compensation signal and the instantaneous value of a system transfer function, C. associating each speech representing input frame with one of a plurality of speech representing standard frames, D. successively accumulating the differences between successive speech representing input frames and the respective associated speech representing standard frames, E. periodically determining an average update signal over a plurality of input words representative of a selected number of said accumulated differences, and F. updating said compensation signal in accordance with said average update signal.

6. The method of claim 5 wherein the accumulating step further comprises the step of
summing the difference between successive speech representing input frames and the respective associated speech representing standard frames.

7. The method of claim 6 wherein the determining step further comprises the step of
finding an average difference value for the summed differences, and
generating said average update signal from the average difference value.

8. The method of claim 7 wherein the updating step further comprises the step of
averaging the average update signal and the current correction signal for generating a new and updated current compensation signal.

9. In a speech recognition method for recognizing elements of a speech input, a method for updating a long term average data signal representing a system transfer function between a speaker and an apparatus input circuitry, said updating method comprising the steps of:

A. initially generating a long term average data signal,

B. generating from said speech input, a succession of input frames representing said speech input modified by a current long term average data signal, each input frame including as a distorting value, an error signal corresponding to the difference between the current long term average data signal and the instantaneous value of a system transfer function, C. associating each speech representing input frame with one of a plurality of speech representing standard frames, D. successively accumulating the differences between successive speech representing input frames and the respective associated speech representing standard frames, E. periodically determining an average difference signal representative of a selected number of said accumulated differences over a plurality of input words, and F. updating said long term average data signal in accordance with said average difference signal.

10. The updating method of claim 9 wherein
said associating step associates each input frame with one of a plurality of speech vectors, said vectors being employed in the speech recognition process.

11. The updating method of claim 10 wherein
said associating step associates each input frame with a spatial volume in a speech recognition decision space, each volume being characterized by its centroid representing the standard frame, and
said accumulating step sums the difference in value between said input frame and the centroid of the associated volume.

12. The updating method of claim 9 wherein
said updating step repeats no more often than about every fifty input words as determined by the speech recognition method.

13. The updating method of claim 9 wherein
said generating step selectively discriminates from generating input frames representing silence or noise.

14. The updating method of claim 9 wherein said updating step comprises the step of
averaging a long term average data signal and an error long term average data signal representing said average difference signal for generating said updated long term average data signal.

15. The updating method of claim 14 wherein said averaging step further comprises the step of
removing any DC offset from said updated long term average data signal.

16. In a speech recognition method for recognizing elements of a speech input, a method for updating a long term average data signal representing a system transfer function between a speaker and an apparatus input circuitry, said updating method comprising the steps of:

A. initially generating a long term average data signal,
B. generating from said speech input, a succession of input frames representing said speech input modified by a current long term average data signal, each input frame including as a distorting value, an error signal corresponding to the difference between the current long term average data signal and the instantaneous value of a system transfer function,
C. associating each speech representing input frame with a spatial volume in a speech recognition decision space, each volume being characterized by its centroid,
D. successively accumulating the differences between successive speech representing input frames and the centroid of the associated volumes,
E. periodically determining an average difference signal representative of a selected number of said accumulated differences over a plurality of input words, and removing any DC offset from said average difference signal, and
F. updating said long term average data signal in accordance with said average difference signal no more often than about every fifth input words as determined by the speech recognition method, and including the step of
averaging a long term average data signal and an error long term average data signal representing said average difference signal for generating said updated long term average data signal.

17. In a speech recognition apparatus for recognizing elements of a speech input, apparatus for updating a long term average data signal, said signal including a system transfer function between a speaker and the recognition apparatus, said updating apparatus comprising:

A. signal generating means for initially generating said long term average data signal,
B. means for generating, from said speech input, a succession of input frames representing said speech input modified by a current long term average data signal, each input frame including, as a distorting value, an error signal corresponding to the difference between the transfer function component of a current long term average data signal and the instantaneous value of a system transfer function,
C. means for associating each speech representing input frame with one of a plurality of speech representing standard frames,
D. means for accumulating the differences between successive speech representing input frames and the respective associated speech representing standard frames,
E. means for periodically determining an average difference signal over a plurality of input words representative of a selected number of said accumulated differences, and
F. means for updating said long term average data signal in accordance with said average difference signal.

18. The updating apparatus of claim 17 wherein
said associating means associates each input frame with one of a plurality of speech vectors, said vectors being employed in the speech recognition process.

19. The updating apparatus of claim 17 wherein
said associating means associates each input frame with a spatial volume in a speech recognition decision space, each volume being characterized by its centroid representing the standard frames, and
said accumulating means sums the difference in value between said input frame with the centroid of the associated volume.

20. The updating apparatus of claim 17 wherein
said updating step repeats no more often than about every fifty input words as determined by the speech recognition apparatus.

21. The updating apparatus of claim 17 wherein
said generating means selectively discriminates from generating input frames representing silence or noise.

22. The updating apparatus of claim 17 wherein said updating means comprises
means for combining a present long term average data signal and an error long term average data signal representing said average difference signal for generating said updated long term average data signal.

23. The updating apparatus of claim 22 wherein said averaging means further comprises
means for removing any DC offset from said updated long term average data signal.

24. In a speech recognition apparatus for recognizing elements of a speech input, apparatus for updating a long term average data signal, said signal including a system transfer function between a speaker and the recognition apparatus, said updating apparatus comprising:

A. signal generating means for initially generating said long term average data signal,
B. means for generating, from said speech input, a succession of input frames representing said speech input modified by a current long term average data signal, each input frame including, as a distorting value, an error signal corresponding to the difference between the transfer function component of a current long term average data signal and the instantaneous value of a system transfer function,
C. means for associating each speech representing input frame with a spatial volume in a speech recognition decision space, each volume being characterized by its centroid representing the standard frames,
D. means for accumulating the differences between successive speech representing input frames and the centroid of the associated volumes,
E. means for periodically determining an average difference signal over a plurality of input words representative of a selected number of said accumulated differences, said means removing any DC offset from said average difference signal, and
F. means for updating said long term average data signal in accordance with said average difference signal no more often than about every fifty input words as determined by the speech recognition apparatus, and including
means for combining a present long term average data signal and an error long term average data signal representing said average difference signal for generating said updated long term average data signal.

* * * * *

UNITED STATES PATENT AND TRADEMARK OFFICE
CERTIFICATE OF CORRECTION

PATENT NO. : 5,008,941
DATED : April 16, 1991
INVENTOR(S) : Vladimir Sejnoha

It is certified that error appears in the above-identified patent and that said Letters Patent is hereby corrected as shown below:

Column 8, line 1 (Equation 1), "$V_j - I_j$" should be --$\bar{V}_j - \bar{I}_j$--.

Column 13, line 28, Claim 16, "fifth" should be --fifty--.

Signed and Sealed this

Twenty-second Day of September, 1992

Attest:

DOUGLAS B. COMER

*Attesting Officer*　　　*Acting Commissioner of Patents and Trademarks*